United States Patent [19]

Powell

[11] Patent Number: 5,047,594

[45] Date of Patent: Sep. 10, 1991

[54] NUCLEAR QUALIFIED IN-CONTAINMENT ELECTRICAL CONNECTORS AND METHOD OF CONNECTING ELECTRICAL CONDUCTORS

[75] Inventor: J. G. Powell, Clifton Park, N.Y.

[73] Assignee: The United States of America as represented by the United States Department of Energy, Washington, D.C.

[21] Appl. No.: 549,982

[22] Filed: Jul. 9, 1990

[51] Int. Cl.[5] ........................ H02G 15/08; H01R 4/00

[52] U.S. Cl. .................................... 174/88 R; 29/868; 29/869; 156/49; 136/232

[58] Field of Search .............. 174/88 R, 73.1, DIG. 7; 29/868, 869; 156/49; 136/232, 233

[56] References Cited

U.S. PATENT DOCUMENTS

| | | | |
|---|---|---|---|
| 3,035,113 | 5/1962 | Danchuk | 174/74 A |
| 3,984,912 | 10/1976 | Johnston et al. | 29/628 |
| 4,018,624 | 4/1977 | Rizzolo | 136/232 X |
| 4,151,364 | 4/1979 | Ellis | 174/84 C |
| 4,266,992 | 5/1981 | Agaisse | 156/49 |
| 4,271,329 | 6/1981 | Perelmuter | 174/84 R |
| 4,383,131 | 5/1983 | Clabburn | 174/73.1 |
| 4,464,540 | 8/1984 | Reeder | 174/35 C |
| 4,487,994 | 12/1984 | Bahder | 174/73.1 |
| 4,589,939 | 5/1986 | Mohebban et al. | 156/49 |
| 4,625,073 | 1/1986 | Breesch et al. | 156/49 X |
| 4,831,214 | 5/1989 | Wilck | 174/73.1 |

OTHER PUBLICATIONS

K. Martin et al., "C-E In-Containment Nuclear Pressure Transmitter: A Qualification Status Report", 10/22/82.

Conax Electric Conductor Seal Assemblies—Bulletin S. A. 1000, (no date).

Insulated Lead Sealing with Conax P. L. Glands, (no date).

*Primary Examiner*—Morris H. Nimmo

*Attorney, Agent, or Firm*—Judy K. Kosovich; William R. Moser; Richard E. Constant

[57] ABSTRACT

A nuclear qualified in-containment electrical connection comprises an insulated, sheathed instrument lead having electrical conductors extending from one end thereof to provide two exposed lead wires, a watertight cable having electrical conducting wires therein and extending from one end of the cable to provide two lead wires therefrom, two butt splice connectors each connecting the ends of respective ones of the lead wires from the instrument lead and cable, a length of heat shrinkable plastic tubing positioned over each butt splice connector and an adjacent portion of a respective lead wire from the cable and heat shrunk into position, a length of heat shrinkable plastic tubing on the end portion of the instrument lead adjacent the lead wires therefrom and heat shrunk thereon and a length of outer heat shrinkable plastic tubing extending over the end portion of the instrument lead and the heat shrinkable tubing thereon and over the butt splice connectors and a portion of the cable adjacent the cable lead lines, the outer heat shrinkable tubing being heat shrunk into sealing position on the instrument lead and cable.

6 Claims, 2 Drawing Sheets

NUCLEAR QUALIFIED IN-CONTAINMENT ELECTRICAL CONNECTORS AND METHOD OF CONNECTING ELECTRICAL CONDUCTORS

The Government has rights in the invention pursuant to Contract No. DE-AC12-76 SN-00052 awarded by the U.S. Department of Energy.

BACKGROUND OF THE INVENTION

1. Field of the Invention

The present invention relates to nuclear qualified in-containment electrical connectors and methods of connecting electrical conductors for use in electrical connections of thermocouples and instrumentation in the environment within the containment of a nuclear power plant.

2. Description of the Prior Art

It has become known that many commercial nuclear power plants were operating with nuclear safety related instrumentation for which there was no documentation showing that the instrumentation would function in the event of a nuclear accident and the resultant exposure of the instrumentation to the environment produced by such a nuclear accident. This problem has become better known as a result of commercial nuclear power plant accidents which have occurred when the industry, government, and public became aware that a reactor melt down was possible and that nuclear environmentally qualified instrumentation was an absolute necessity in order to avoid a disaster. Government regulatory bodies over the last few years has exerted great pressure on operating utilities to demonstrate and document that nuclear safety related instrumentation would function when required under the high temperature, pressure, steam and radiation conditions resulting from a nuclear accident. This has resulted in costly instrument redesign and nuclear environmental qualification test programs by instrument vendors, power plant design agencies, and utilities which have taken years to complete. Such qualification programs have often met with frustration when instruments failed the qualification testing and required design changes and repetition of lengthy and costly qualification programs. One of the common problems affecting the qualification programs was the inability to seal the electrical wires entering the instrument. Failure of this seal results in moisture and chemicals entering the instrument resulting in instrument failure.

Development programs have been reported on the effects of aging on the performance and reliability of equipment, including environmental testing such as accident dose irradiation testing of an in-containment portion of a pressure transmitter system utilizing an electro-mechanical transducer which failed, the cause of failure being subsequently determined to be shorting of the turns inside the coils due to ingress of chemical laden moisture. It was found that under 66 psig steam pressure, water had entered cracks in the pigtail insulation and had migrated down the wire stranding into the sealed area between the core plug and the core, and migrated by capillary action up the stranded leads and into the coil where it shorted the coil windings causing the unit to fail. "CE In-Containment Nuclear Pressure Transmitter: A Qualification Status Report", TIS-7330, by K. A. Martin, J. S. Dietrich, A. A. Oja, and C. R. Musick, Nuclear Power Systems, Combustion Engineering, Inc., Windsor, Conn., presented at the Nuclear Power Systems Symposium, Oct. 22, 1982, Washington, D.C.

Other types of electric conductor seal assemblies for in-containment applications for normal and abnormal conditions including seismic and loss of coolant accident (LOCA) design basis events are known from Conax Corporation Bulletin SA 1000, "Conax Electric Conductor Seal Assemblies", Conax Corporation, Buffalo, N.Y. Conax Corp. also provides a commercially available feed through connector shown in a catalog and entitled "Insulated Lead Sealing with Conax PL Glands for use including nuclear applications".

The use of heat shrinkable tubing, or dimensionally recoverable sleeves, in electrical connector assemblies is also known from U.S. Pat. No. 4,518,819, U.S. Pat. No. 4,464,540, U.S. Pat No. 4,487,994 and U.S. Pat. No. 3,984,912 for example.

BRIEF SUMMARY OF THE INVENTION

It is an object of this invention to overcome the above problems by providing a nuclear qualified electrical connection and method of making a nuclear qualified electrical connection, which is sealed to prevent entry of moisture and chemicals entering the connection and an associated instrument therewith.

It is a further object of the invention to provide a sealed electrical connection, and method of making the connection, which is sealed by the particular construction thereof utilizing watertight Military Specification cable and heat shrinkable tubing for sealing the connection and instrumentation associated therewith from the ingress of chemically laden moisture.

It is a further object of the invention to provide a nuclear qualified in-containment ambient thermocouple which is sealed against the ingress of harmful chemically laden moisture.

It is a still further object of the invention to provide an electrical connection for use with nuclear environmentally qualified instrumentation which is capable of continuous functioning in event of a nuclear accident when exposed to the effects thereof.

It is a further object of the invention to provide a method of making a nuclear qualified, in-containment, electrical connection for associated instrumentation, and/or a thermocouple in a sealed manner to prevent moisture entering the connection and causing a failure of the instrumentation, even under adverse conditions produced by a nuclear accident.

The above objects are accomplished by the invention which comprises essentially an electrical connection between lead wires from an instrument such as a thermocouple, for example, and lead wires from a watertight cable, which are spliced together, respectively by a crimped connector about which a plurality of heat shrinkable tubes are positioned and subsequently heated to contract them onto the conductors coverings and connectors within the sealed joints.

In carrying out the method of the invention, the lead wires from an insulated electrical conductor leading to an instrument and the lead wires from a watertight cable from which the braided metal armor and outer sheath have been removed adjacent the seal joint, and over one or the other of which a heat shrinkable tubing section is positioned, are inserted in opposite ends of tubular crimping type connectors, a crimping tool is applied to crimp the connectors onto the ends of the lead wires connecting them electrically and structurally together, after which the heat shrinkable tubing is positioned over each connector and a portion of the adjacent lead wire from the cable, and heat is applied thereto to shrink the tubing onto these elements. Heat shrinkable tubing is also provided over the cable overlying the positions where the sheathing has been removed and further heat shrinkable tubing is positioned over the insulated conductor from the instrument adjacent the lead wires therefrom, and finally a length of outer heat shrinkable tubing is positioned over the connection extending from the unarmored portion of the cable and the end portion of the lead wire from the instrument, so that when heated this outer heat shrinkable tubing shrinks onto the assembly sealing both ends thereof.

BRIEF DESCRIPTION OF THE DRAWINGS

The invention will now be described in detail with reference to the accompanying drawings wherein.

DETAILED DESCRIPTION

Figure 1:
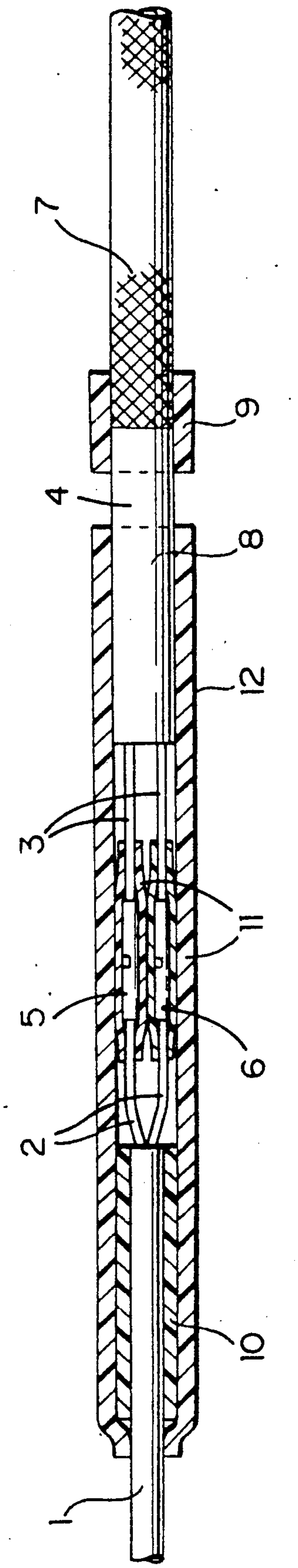
FIG. 1 is a longitudinal cross-sectional view of a first embodiment of the connector and method of connecting electrical conductors in accordance with the invention.

The invention will be described in an embodiment of a thermocouple as shown in FIG. 1 wherein a metallic, sheathed thermocouple 1, the details of which are not shown, has lead wires 2 connected respectively to lead wires 3 of a watertight Military Specification Cable 4 by an alumel butt splice 5 and chromel butt splice 6. The lead wires 2 and 3 are connected by inserting them into opposite ends of the elements 5 and 6 which are thereafter crimped by a crimping tool (not shown) to butt splice the lead wires together, respectively. Both the alumel and chromel connectors are of the type having an outer insulation support. Connector 5 is alumel (green-negative-magnetic) in accordance with "AMP" No. 1-322325-0 and connector 6 is chromel (grey-positive-nonmagnetic) in accordance with "AMP" No. 1-322325-1. The cable 4 is a shipboard electric cable made in accordance with military specification MIL-C-915E, Type TCKX-1. This cable 4 is made with a sealing material around the conductor strands and between conductors so that it is watertight, and hosing of water down the cable or conductors is precluded even under differential pressure conditions. The cable has a braided metal armor on its outer surface, and the end of the armor is stripped away from the cable at the portion 8 thereof which is adjacent to the end of the lead wires 3 extending therefrom. Heat shrink tubing 9 of the type known as "Raychem" No. WCSF-200-N is placed over the armored end portion of the braided metal armor and the adjacent portion of the unarmored section 8 and is shrunk onto these portions of the cable by the application of heat in a known manner. A section of the thermocouple wire 1 at the portion thereof adjacent the stripped end to provide lead wires 2 is covered with heat shrink tubing 10 of the same type as 9 described above and is shrunk thereon by the application of heat in the same manner. Further heat shrink tubing 11 is fitted over each of the elements 5 and 6 respectively, and the portion of the respective lead wires 3 from cable 4 adjacent thereto and is shrunk thereon by the application of heat. This heat shrink tubing 11 is in accordance with "Raychem" No. WCSF-070-N. The butt splice connectors 5 and 6 and the adjacent ends of the thermocouple 1 and the unarmored portion 8 of cable 4 are covered with a further heat shrink tubing 12 made in accordance with "Raychem" No. WCSF-300-N. Heat shrink tubing 11 may be installed on lead wires 3, for example, prior to crimping of butt splice elements 5 and 6 and thereafter slipped over elements 5 and 6 prior to heating thereof to shrink onto the lead wires 3 and the elements and 6 to form a sealed joint.

Elements 5 and 6 also match the wire material to which they are connected. In addition, the heat shrink tubing is of the nuclear qualified type, that is the type which is acceptable for use in a nuclear environment such as in the containment of a commercial nuclear power reactor facility. The assembly described above comprises a metallic sheathed ceramic insulated thermocouple spliced to the watertight cable to provide a temperature sensor assembly qualified to the following parameters in accordance with IEEE Standard 323-1974 IEEE Standard for Qualifying Class 1 Equipment for Nuclear Power Generator Stations:

DESIGN LIFE: 25 years minimum at 115° F. design temperature

PEAK TEMPERATURE: 540° F.

PEAK PRESSURE: 1200 psig

RADIATION: $32\times10^6$ Rads Gamma $300\times10^6$ Rads Beta

Normal commercial qualification is in the range of peak temperature of 475° F., peak pressure of 65 psig, and radiation of $2\times10^6$ Rads.

Figure 2:
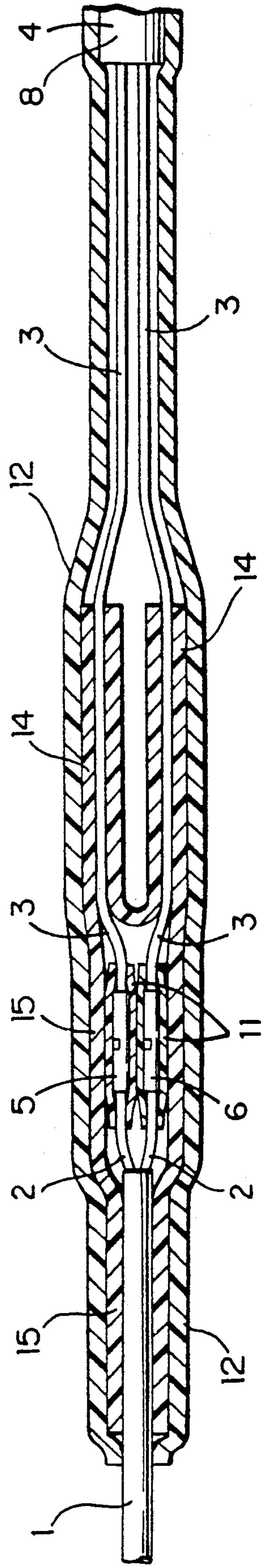
FIG. 2 is a view similar to FIG. 1 showing a second embodiment of the invention.

A second embodiment of the invention is shown in FIG. 2 wherein the same components of the thermocouple type temperature sensors are identified by the same numbers. In this second embodiment leads 3 from the cable 4, the unarmored end 8 only of which is shown in this figure, extend through hollow fingers 14 of a two fingered heat shrink tube 15, which is similar to heat shrink tubing 11 of the embodiment of FIG. 1, but in this embodiment, heat shrink tubing 15 extends continuously from the end portion of thermocouple 1 adjacent butt splice elements 5 and 6, around elements 5 and 6, and at the fingers 14 over a greater portion of the lead wires 3 as shown.

The invention as shown in the embodiments of FIGS. 1 and 2 is the first application of watertight Military Specification cable in accordance with MIL-C-915-E as part of a nuclear environmentally qualified instrument. Three types of this watertight cable have been qualified by the Knolls Atomic Power Laboratory (KAPL) for a nuclear accident environment in accordance with commercial nuclear qualification standard IEEE 323-1974. Watertight cable is manufactured with a sealing material around the conductor strand and between conductors to make the cable watertight under a differential pressure so that hosing of water down the cable or conductors under differential pressure conditions is precluded. Commercially qualified cable is not watertight and will hose if the cable or conductor insulation cracks under nuclear accident environmental conditions. The above referred to military specification does not require the cable to function under the nuclear accident conditions, and therefore special nuclear qualification testing was required for this invention. Hosing of moisture in commercial cables has been a commercial nuclear industry problem for many years, as highlighted in NRC IE Circular No. 79-05, "Moisture Leakage In Stranded Wire Conductors"; U.S. Nuclear Regulatory Commission to Nuclear Power Plants (Mar. 20, 1979).

The different embodiments of FIGS. 1 and 2 provide different levels of environmental qualification. In the embodiment of FIG. 1 the splice depends on the integrity of the cable sheath 8 to prevent moisture from hosing down the cable 4 and thereby causing a failure of the device. The splice of the embodiment of FIG. 2 depends only on integrity of the conductor insulation and strand sealing material to prevent hosing of moisture from causing a failure. This embodiment is qualified to the highest environmental level.

Figure 4:
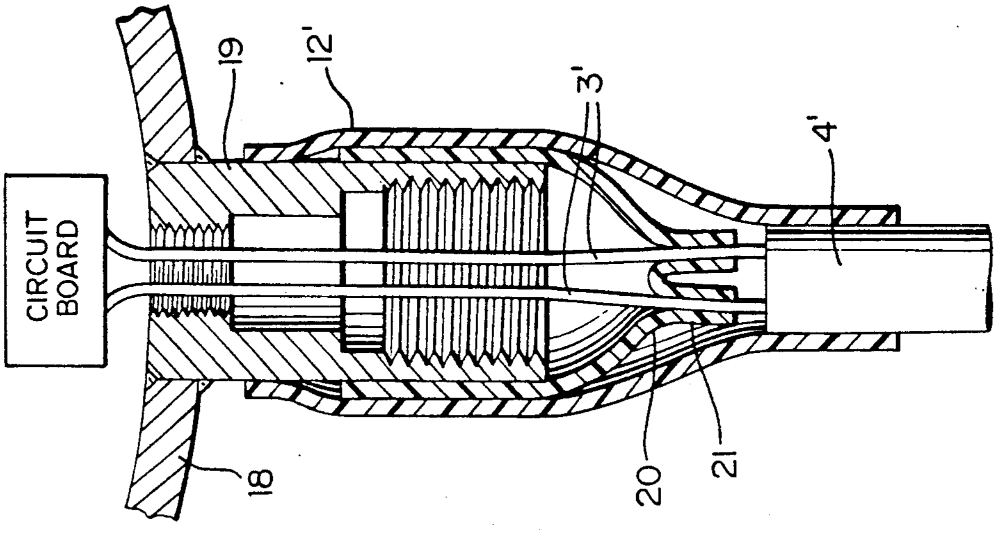
FIG. 4 is a view similar to FIG. 3 showing a still further embodiment of the invention.
Figure 3:
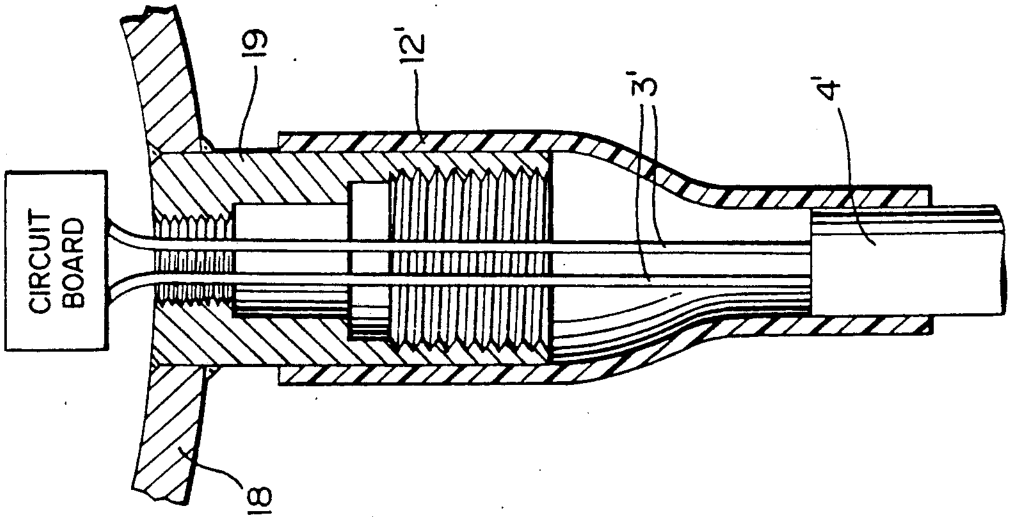
FIG. 3 is a longitudinal cross-sectional view of a third embodiment of the invention.

The concept of the invention as shown in the embodiments of FIGS. 1 and 2 can also be directly applied to other types of instrumentation such as pressure transmitters in the manner shown in FIGS. 3 and 4 for example.

In FIG. 3 the outer shell or casing 18 of a differential pressure electronic transmitter, only part of which is shown, contains a circuit board within it which is protected from an ambient nuclear environment to which the casing is exposed on its outer surface. The signal output wires 3' pass through the wall of casing 18 through a tubular fitting 19 to which an external screw threaded connection might normally be attached. In accordance with the invention however, the lead wires 3' extending from the watertight cable 4' are connected at one end to the circuit board, shown only schematically, and heat shrink tubing 12' is positioned over the outer surface of the fitting 19 and outer surface of the cable 4' after which heat is applied to shrink the tubing 12' onto these elements at both ends thereof thereby sealing the interior of fitting 19 from the ingress of moisture and chemically laden moisture into the interior of the pressure transmitter thereby avoiding damage to the instrument or causing erratic operation. In the type of installation in which this instrument is intended for use, the differential pressure between the interior and exterior of the casing 18 may be as high as 75 or 80 psig. In a prior wire penetration system for similar use, the wires or conductors pass through a hermetic sealed header in a gland shell with an epoxy filler within the fitting 19. However at the above differential pressure steam entered between the gland shell and the epoxy creating an electrical leakage path and caused sporadic output variations of the instrument.

In FIG. 4 is shown a modification of the embodiment of FIG. 3 wherein an additional heat shrink tubing 20 having a 2 finger structure 21 through which the conductors 3' pass is provided between the outer wall of fitting 19 and the outer heat shrink tubing 12'. This tubing 20 is therefore similar to that shown at 14 in the embodiment of FIG. 2, and provides an enhanced sealing against intrusion of chemically laden moisture into the instrument.

I claim:

1. A method of making a nuclear qualified electrical connection between electrical conductors comprising:

stripping the ends of an insulated instrument wire to expose two electrical conductors extending therefrom;

providing a watertight electrical cable comprised of sealing material around and between electrical conductors thereof;

stripping an end of said watertight cable to expose two electrical conductor lead wires extending from said end of the cable;

positioning a length of a first heat shrinkable tubing onto each of said cable lead wires;

positioning a length of a second heat shrinkable tubing on the end of said instrument wire adjacent the stripped end thereof;

positioning a length of an outer third heat shrinkable tubing on said watertight cable having a length sufficient to cover an end portion of said insulated wire adjacent said conductors therefrom and the end portion of said cable adjacent said cable lead wires;

providing two butt spliced connectors;.

inserting the ends of each of said instrument conductors into an end of a respective one of said butt splice connectors;

inserting said ends of said cable lead wires into opposite ends of respective ones of said butt spliced connectors;

crimping each of said butt splice connectors to electrically and structurally connect said respective ends of said lead wires together;

positioning said first heat shrinkable tubing on each of said cable lead wires over a portion of said cable lead wires and said respective butt spliced connector;

heating said first and second heat shrinkable tubing to shrink said first and second tubing onto the respective parts covered thereby;

positioning said outer third heat shrinkable tubing so that it extends over the ends of said cable and instrument wire; and heating said outer third heat shrinkable tubing to shrink said outer third heat shrinkable tubing onto said respective ends of said instrument wire and cable and onto said butt splice connectors therebetween.

2. The method as claimed in claim 1 wherein the watertight cable is an armored cable containing an outer sheath of braided metal armor thereon and further comprising:

stripping off the armor sheath from an end portion of the cable adjacent said lead wires extending therefrom;

providing a length of a fourth heat shrinkable tubing having a length extending over a portion of the armor and a portion of the cable outer surface from which the armor has been removed; and heating said fourth heat shrinkable tubing to shrink said fourth tubing into tight sealing engagement over the junction area between the armor and the stripped portion of the cable.

3. A nuclear qualified in-containment electrical connection comprising:

an insulated, sheathed instrument lead having electrical conductors therein, the ends of said electrical conductors extending from one end of said instrument lead to provide two exposed lead wires extending from said instrument lead;

a watertight cable having electrical conducting wires therein and sealing material around and between said electrical conductors so that said cable is watertight under a differential pressure, said conducting wires extending from one end of said cable to provide two instrument lead wires therefrom;

two butt splice connectors each connecting the ends of respective ones of said lead wires from said instrument lead and said cable;

a length of a first heat shrinkable plastic tubing positioned over each butt splice connector and an adjacent portion of a respective lead wire from said cable, said tubing being heat shrunk into position;

a length of a second heat shrinkable plastic tubing on the end portion of said instrument lead adjacent said lead wires therefrom, said heat shrinkable tubing being heat shrunk onto said instrument lead; and a length of outer an outer third heat shrinkable plastic tubing extending over said end portion of said instrument lead and said heat shrinkable tubing thereon and over said butt spliced connectors and a portion of said cable adjacent said cable lead lines, said outer third heat shrinkable tubing being heat shrunk into sealing position on said instrument lead and said cable.

4. The connection as claimed in claim 3 and further comprising:

an armor outer layer on the outer surface of said cable, a portion of which has been stripped from the cable within said outer third heat shrinkable tubing; and a further length of a fourth heat shrinkable plastic tubing extending over a portion of said armor and a portion of said cable from which said armor has been stripped and heat shrunk into position to seal the joint at the stripped end of said armor.

5. The connection as claimed in claim 3, wherein:

said second heat shrinkable plastic tubing extends from said instrument lead over said butt splice connectors and has two tubular extensions thereon disposed between said butt splice connectors and said cable, each of said cable lead wires extending respectively through one of said tubular elements, said tubular elements being head shrunk onto said cable lead wires extending therethrough.

6. An electrical connection as claimed in claim 3 wherein:

said instrument lead comprises a metallic, sheathed thermocouple having lead wires extending from one end thereof.

* * * * *